Dec. 22, 1931.  G. J. QUALMAN  1,837,482
LAUNDRY APPARATUS
Filed April 16, 1927   2 Sheets-Sheet 1
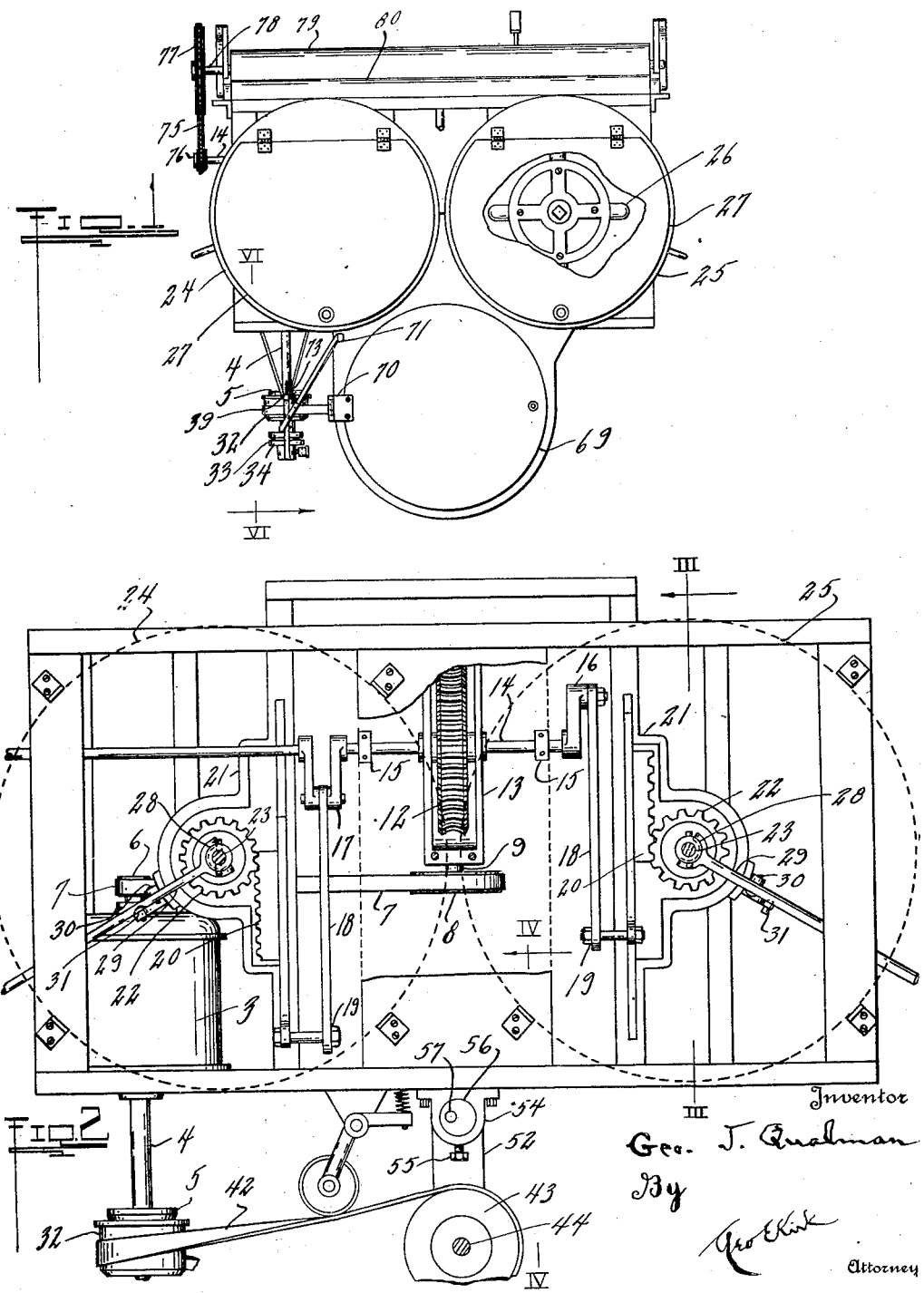
Inventor
Geo. J. Qualman
By
Geo E Kirk
Attorney

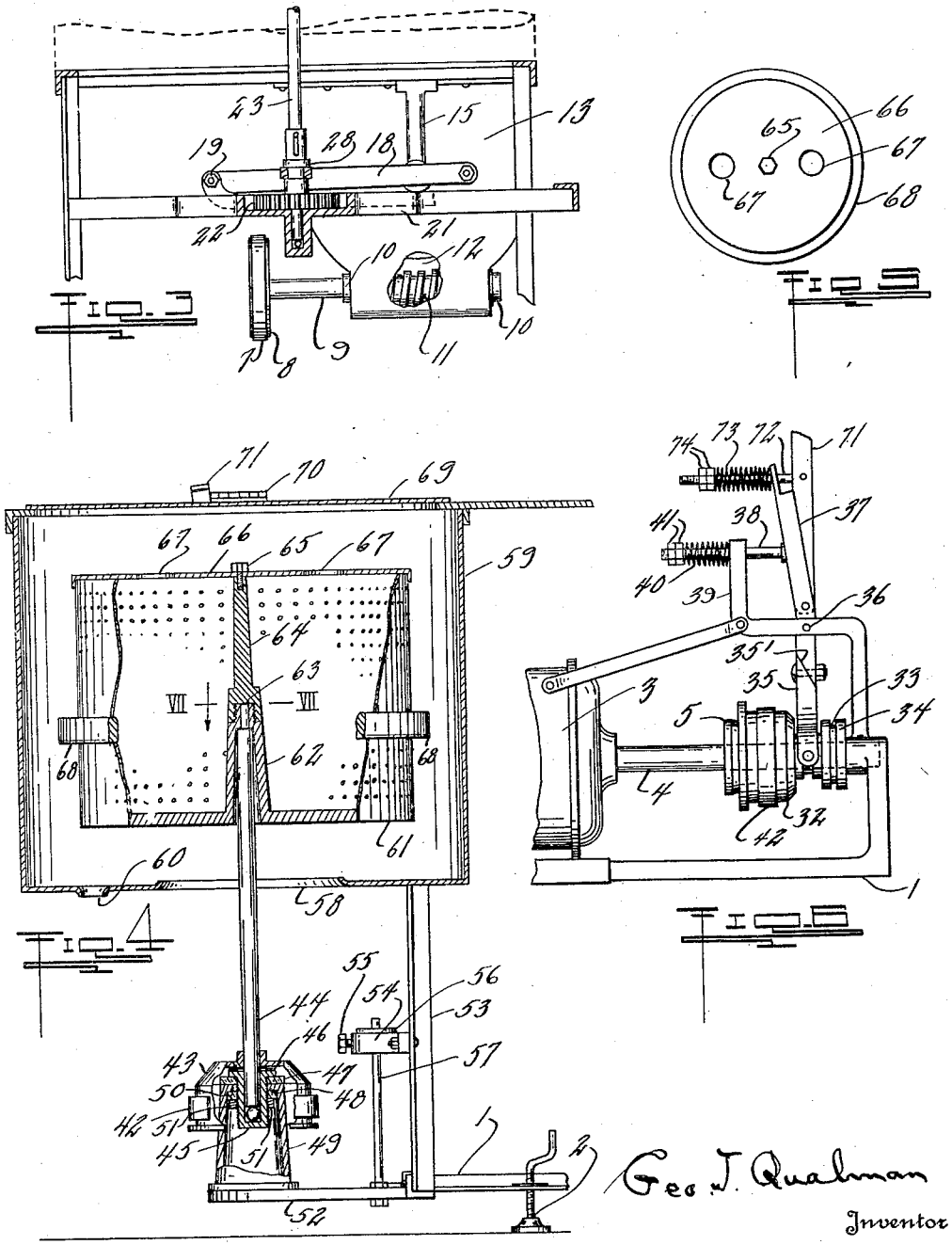

Patented Dec. 22, 1931

1,837,482

UNITED STATES PATENT OFFICE

GEORGE J. QUALMAN, OF TOLEDO, OHIO

LAUNDRY APPARATUS

Application filed April 16, 1927. Serial No. 184,241.

This invention relates to power driven domestic equipment.

This invention has utility when incorporated in clothes cleansing and care apparatus as laundering.

Referring to the drawings:

Fig. 1 is a plan view with parts broken away of an embodiment of the invention as a washing, drying, and ironing apparatus;

Fig. 2 is a view on an enlarged scale of the device of Fig. 1 with the containers removed and portions broken away;

Fig. 3 is a section on the line III—III, Fig. 2;

Fig. 4 is a section on the line IV—IV, Fig. 2;

Fig. 5 is a plan view of the drier or extractor container;

Fig. 6 is a fragmentary view on the line VI—VI, Fig. 1; and

Fig. 7 is a section on the line VII—VII, Fig. 4.

Base 1 is provided with a plurality of leveling devices 2. Mounted on this base 1 is motor 3 having shaft 4 extending therefrom having fixed on one end thereof clutch member 5 and on an opposite end thereof, as protruding from the motor 3, is pulley 6. From this pulley 6 extends belt 7 about pulley 8 on shaft 9 mounted in bearings 10 and having worm 11 in mesh with worm wheel 12 disposed in housing 13. This worm wheel 12 is fast on shaft 14 mounted in bearings 15. At one side of this worm wheel 12 as central of the base 1, this shaft 14 is provided with crank 16 and on the opposite side thereof with crank 17. From these cranks 16, 17, extend links 18 to pivot bearings 19 connected with rack bars 20 reciprocable in lubricant carrying guide plates 21 there to be in mesh with pinions 22 fixedly mounted on shafts 23 as protruding upward into respective containers or tubs 24, 25, there to carry clothes agitators or dollies 26. The guide plates 21 are peripherally flanged so that a lubricant may be introduced therein for oiling the rack and pinion as as intermeshing, as well as the bearing for the pinion.

These tubs 24, 25, are provided with hinged lids 27. Each of these pinions 22 has fixed therewith collar 28 with which may engage lever 29 mounted in fulcrum 30 swingable as to its free end downward past pin 31 for holding the pinion 22 elevated and out of mesh with the rack 20 for stopping the dolly 26. Upon swinging the lever 29 on its fulcrum 30 clear of the pin 31 and allowing the pinion 22 to drop back into mesh with the rack 20, there is a return of the driving operation for the washing machine of this dolly type in the respective tubs or containers 24, 25.

The shaft 4 beyond the clutch elements 5 carries loosely thereon pulley 32 and brake element 33. As this pulley 32 is moved out of engagement with the clutch 5 it may be shifted sufficiently to have brake element 33 engage fixed element 34 fast with the frame 1. This pulley 32 is loose on the shaft 4 may be shifted by lever 35 having fulcrum bearing 36. Joint 35′ in the lever 35 permits flexible action of this lever 35 in co-acting with the collar for shifting the pulley 32 and the brake 33. This takes care of slight out-of-line conditions. This lever 35 has bent arm 37 from which extends rod 38 as passing through bracket 39 braced from the frame 1. This rod 38 upon the side of the bracket 39 remote from the lever arm 37 is provided with compression helical spring 40, the adjustment of which may be determined by nuts 41 for normally shifting and holding the lever 35, 37, into braking position with the elements 33, 34, abutting.

About the pulley 32 extends belt 42 as a cross belt to drive pulley 43 fast with shaft 44. This shaft 44 is mounted in cup 45 having upper flange 46 resting on rubber washer 47. This flange 46 has an outer rim so that the cup 45 may retain lubricant for the shaft 44 is rotatable therein when driven by the pulley 43. This washer 47 is mounted on flange 48 of base 49. Below this flange 48 is rubber washer 50 sustained by nut 51 on the cup 45. These washers 47, 50, are yieldable members normally tending to maintain the shaft 44 in position perpendicular as to the base 1.

From this base 1 is hinged arm 52 to carry this supplemental base 49 for the shaft 44.

Rising from this base 1 is bracket 53 upon which is mounted bearing ring 54 having set screw 55 which may be backed off to release rotatable eccentric 56 having stem 57 thereon. This eccentric 56 is for shifting the stem 57 to vary the position of the base 49 as to the base 1. This permits delicacy in adjustment to care for nicety in leveling or locating the shaft 44 for operating in a truly vertical position. As the adjustment is effected, set screw 55 may be returned to locking position. The shaft 44 extends upward through opening 58 of container 59 having drain outlet 60 for moisture as discharged from perforate container 61 having central column 62 and key connection 63 with the shaft 44. From this column 62 there is upstanding stem 64 permitting assembly by bolt 65 of cover 66 having vent openings 67 therein. There is thus provided a simple means for assembling extractor or drier cover to the container 61. This container 61, approximately in the plane of the connection 63 with the shaft 44 and remote from such connection to lie exterior of this vessel 61, is provided with fly weight 68 herein shown in the form of a ring. This ring 68 is continuous and accordingly has a minimum of resistance. This stabilizing mass under rotation accordingly tends to approximate a horizontal plane in the plane of the key connection of the vessel 61 with the shaft 44 which connection is not only central radially of the container 61 but medially of the vertical height or altitude of the container as normally under load with say clothing to have the moisture removed therefrom in effecting drying operation of the centrifugal extractor, for the moisture is thrown through the openings in the container 61 to be collected by vessel 59 and pass therefrom by opening 60. This stabilizing counter-weight 68 is of maximum effectiveness for minimum of weight and tends to relieve any strains upon the connection 63 and is thus a factor for economical upkeep of equipment in simplified construction of this aluminum vessel 61.

As the container 61 is charged and closed, extractor lid 69 may be swung on its hinge 70 into closed position. Handle 71 having pivotal connection 36 common with the lever 35, 37, may then be shifted to position snapping back of the hinge 70 as remote from the tub 24. Rod 72 from this lever 71 has thereon compression spring 73 adjusted by nuts 74. This spring 73 abuts the upper offset end of the arm 37 of the lever 35, 37, when the side of the spring 73 is toward the arm 71.

Accordingly, this throwing of the lever 71 to a position adjacent the hinge 70 is effective yieldably through the spring 73 to throw the lever 37, 35, into such position that the pulley 32 is driven by the clutch 5 and there is thus rotation imparted to the extractor basket or container 61. As the drying operation is completed, the operator may throw off the lever 71 to stop the extractor. In the absence of taking such course, merely lifting the lid 69 of the extractor 59 serves to shift the lever 71 clear of the hinge 70 so that the springs 73, 40, are effective in disconnecting the pulley 32 from the clutch 5 and throwing in the brake 33, 34. There is thus introduced a drag on the belt 42 instead of a drive with consequent quick stopping of the light weight extractor basket 61 from rotation. Accordingly, the attendant may at once remove the garments or other clothing from the container 61 upon taking off the lid 66.

This clothing may have the laundering operation completed from this common single driving source by connecting sprocket chain 75 with sprocket wheel 76 on shaft 14 as protruding from the region adjacent the tub 24. This sprocket chain 75 passes about sprocket wheel 77 on shaft 78 for operating a mangle roll 79 in proximity to heating element 80 of the ironer. When it is desired to disconnect the mangle or ironer, it is only necessary to roll the chain 75 out of driving engagement with the sprockets. It is accordingly seen that from a common driving source of the motor 3, two shafts 4, 14, as provided with the transmission interconnections, may be selectively connected manually for either of two washing machines, an extractor or an ironer.

What is claimed and it is desired to secure by Letters Patent is:

1. A base, a first shaft parallel to the base, a drive for the first shaft, a second shaft, a mounting for the second shaft independently holding the second shaft to approximate perpendicular as to the base, a flexible transmission connection from the first shaft to the second shaft laterally at said mounting, and a member having a recess in its lower side centrally upwardly extending thereinto and terminating in a seat, and a key connection for said seat between the member and the second shaft, the walls of the recess below said seat being spaced from said shaft.

2. A base, a shaft, a mounting for the shaft independently holding the shaft to approximate perpendicular as to the base, a member to be loaded keyed with the shaft terminus upwardly from the base, said member extending about the shaft below the key connection to the shaft terminus having a clearance chamber in the member laterally as to the shaft, and a load for the member approximately in the plane of the key connection and radially exterior of the member spaced by the member from the shaft and sustained directly on the member and therethrough indirectly on the shaft.

3. A base, a shaft, a mounting for the shaft independently holding the shaft to approximate perpendicular as to the base, a member keyed to the shaft centrally of the member diameter and altitude, said member in its extent along the shaft below the key connection to the shaft having clearance laterally as to the shaft, and a load balancing ring approximately in the plane of the key connection and rockable relatively to the shaft mounting, said ring being exterior of and fixed directly with and on the member approximating the horizontal plane centrally of the altitude of the member.

In witness whereof I affix my signature.

GEORGE J. QUALMAN.